US012710960B2

(12) United States Patent
Xiao et al.

(10) Patent No.: US 12,710,960 B2
(45) Date of Patent: Aug. 18, 2026

(54) ASSESSING JAVA SBOM ACCURACY AND COMPLETENESS

(71) Applicant: INTERNATIONAL BUSINESS MACHINES CORPORATION, Armonk, NY (US)

(72) Inventors: Yue Xiao, Bloomington, IN (US); Douglas Lee Schales, Ardsley, NY (US); Dhilung Hang Kirat, Hartsdale, NY (US); Ted Augustus Habeck, Hopewell Junction, NY (US); Jiyong Jang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 18/525,138

(22) Filed: Nov. 30, 2023

(65) Prior Publication Data

US 2025/0181349 A1 Jun. 5, 2025

(51) Int. Cl.
*G06F 8/75* (2018.01)
*G06F 8/60* (2018.01)

(52) U.S. Cl.
CPC . *G06F 8/75* (2013.01); *G06F 8/60* (2013.01)

(58) Field of Classification Search
None
See application file for complete search history.

(56) References Cited

U.S. PATENT DOCUMENTS 9,563,420 B2 * 2/2017 Osminer ............. G06F 9/44589
9,760,349 B1 * 9/2017 Chen ....................... G06F 8/433
11,150,888 B2 10/2021 Beard
11,893,120 B1 * 2/2024 Jennings ................. G06F 8/433
11,947,956 B2 * 4/2024 Jang ........................ G06F 8/447
12,197,912 B2 * 1/2025 Balasubramanian ..... G06F 8/73
2001/0049682 A1 * 12/2001 Vincent ................. G06F 16/284
2008/0052675 A1 * 2/2008 Wookey .................... G06F 8/61 717/104

(Continued)

FOREIGN PATENT DOCUMENTS

CN 115454496 A 12/2022
CN 115658128 A 1/2023

(Continued)

OTHER PUBLICATIONS

Alberts et al., “Acquisition Security Framework (ASF): Informing Software Bill of Materials (SBOM) Use Cases and Risk Reduction”, Carnegie Mellon University, Software Engineering Institute, Feb. 2023, pp. 1-27.

(Continued)

*Primary Examiner* — Jason D Mitchell
(74) *Attorney, Agent, or Firm* — CHIP LAW GROUP

(57) ABSTRACT

Methods and systems for assessing a software bill of materials (SBOM) include extracting package names from code of an application to identify first dependencies of the application. Package names are extracted from accesses by the application to identify second dependencies of the application. A quality score is generated for an SBOM of the application based on a comparison of the contents of the SBOM to the first dependencies and the second dependencies. An action is performed responsive to the quality score.

17 Claims, 6 Drawing Sheets

(56) References Cited

U.S. PATENT DOCUMENTS

2008/0201705 A1* 8/2008 Wookey .................. G06F 8/658 717/175
2016/0063244 A1* 3/2016 Zhang .................. H04N 21/812 726/23
2016/0210224 A1* 7/2016 Cohen ................. G06F 11/3684
2019/0220262 A1* 7/2019 Fox ........................... G06F 8/61
2020/0110601 A1* 4/2020 Shah ................... G06F 11/3612
2021/0097037 A1* 4/2021 Babol ................. G06F 11/1004
2023/0072264 A1 3/2023 Coccia
2023/0140160 A1* 5/2023 Vetsch .................. G06F 16/285 726/25
2023/0186213 A1* 6/2023 Tr ............................ G06N 5/01 705/7.28
2023/0359744 A1* 11/2023 Duggan .................... G06F 8/65
2024/0211221 A1* 6/2024 Zhang ..................... G06F 9/542
2024/0273196 A1* 8/2024 Steinberg .................. G06F 8/75
2024/0289745 A1* 8/2024 Larkin .................. G06F 21/572
2024/0330430 A1* 10/2024 Chintala ................. G06F 21/44
2025/0181349 A1* 6/2025 Xiao .......................... G06F 8/77
2025/0190575 A1* 6/2025 Kirat ..................... G06F 21/577

FOREIGN PATENT DOCUMENTS

CN 115809348 A 3/2023
CN 115905895 A 4/2023
CN 116166307 A 5/2023
CN 116483435 A 7/2023

OTHER PUBLICATIONS

Shi et al., "An Experience Report on Producing Verifiable Builds for Large-Scale Commercial Systems", IEEE Transactions on Software Engineering, vol. 48, No. 9, Sep. 2022, pp. 3361-3377.
Balliu et al., "Challenges of Producing Software Bill of Materials for Java", arXiv:2303.11102v2 [cs.SE] Jun. 7, 2023, pp. 1-11.
Stockhausen et al., "Continuous security patch delivery and risk management for medical devices", In 2020 IEEE International Conference on Software Architecture Companion (ICSA-C) Mar. 1, 20206, pp. 204-209.
Nadgowda et al., "Engram: The One Security Platform for modern Software Supply Chain Risks", In Proceedings of the Eighth International Workshop on Container Technologies and Container Clouds Nov. 7, 2022, pp. 7-12.
Bi et al., "On the Way to SBOMs: Investigating Design Issues and Solutions in Practice", arXiv:2304.13261v1 [cs.SE] Apr. 26, 2023, pp. 1-17.
Gupta et al., "Open-Source Software Security Challenges and Policies for Cloud Enterprises", In 2023 3rd International Conference on Intelligent Communication and Computational Techniques (ICCT) Jan. 1, 20239, pp. 1-6.
Stoddard et al., "Software Bill of Materials (SBOM) Sharing Lifecycle Report", Idaho National Lab.(INL), Idaho Falls, ID (United States); Apr. 1, 20231, pp. 1-23.
Zahan et al., "Software Bills of Materials Are Required. Are We There Yet?", IEEE Security & Privacy. Apr. 1, 20234, pp. 1-6.
Arora et al., "Strengthening the Security of Operational Technology: Understanding Contemporary Bill of Materials", Journal of Critical Infrastructure Policy, Jul. 22, 2022, pp. 1-25.
Nadgowda et al., "tapiseri: Blueprint to modernize DevSecOps for real world", In Proceedings of the Seventh International Workshop on Container Technologies and Container Clouds Dec. 6, 2021, pp. 13-18.
Enck et al., "Top Five Challenges in Software Supply Chain Security: Observations From 30 Industry and Government Organizations", IEEE Security & Privacy. Mar. 2, 20224, pp. 96-100.
Martin, "Visibility & Control: Addressing Supply Chain Challenges to Trustworthy Software-Enabled Things", In 2020 IEEE Systems Security Symposium (SSS) Jul. 1, 2020, pp. 1-4.

* cited by examiner

ASSESSING JAVA SBOM ACCURACY AND COMPLETENESS

BACKGROUND

The present invention generally relates to software dependency analysis and, more particularly, to assessing a software bill of materials (SBOM).

Complex software may involve a network of interdependencies, where any code unit can leverage software from a variety of different sources. This complexity is magnified by dependencies and transitive dependencies, which poses a security risk in the event that a software package in the supply chain is attacked. Such an attack may target a widely used component, and render downstream software vulnerable as well.

An SBOM functions as a list of components for software that catalogs the modules, libraries, and components used in building and using the software. This provides transparency so that vulnerabilities can be identified and patched, thereby improving the security and integrity of the software supply chain. However, the utility of an SBOM is limited by its accuracy and completeness, as an incomplete or inaccurate SBOM may mislead downstream software consumers, leading them to misjudge potential security risks.

SUMMARY

A method for assessing a software bill of materials (SBOM) include extracting package names from code of an application to identify first dependencies of the application. Package names are extracted from accesses by the application to identify second dependencies of the application. A quality score is generated for an SBOM of the application based on a comparison of the contents of the SBOM to the first dependencies and the second dependencies. An action is performed responsive to the quality score.

A system for assessing an SBOM includes a hardware processor and a memory that stores a computer program. When executed by the hardware processor, the computer program causes the hardware processor to extract package names from code of an application to identify first dependencies of the application. Package names are extracted from accesses by the application to identify second dependencies of the application. A quality score for an SBOM of the application is generated based on a comparison of the contents of the SBOM to the first dependencies and the second dependencies. An action is performed responsive to the quality score.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The actual dependencies of a piece of software may be identified using code-level analysis of static binary code. These dependencies may be compared to corresponding software bills of materials (SBOMs) to identify inaccuracies and missing declarations. Rather than simply verifying the format of an SBOM file, a quality score may be generated based on the actual content of the software to specifically target missing or incorrect dependencies with security implications. Root causes for any inaccuracies and incompleteness may further by analyzed.

Figure 1:
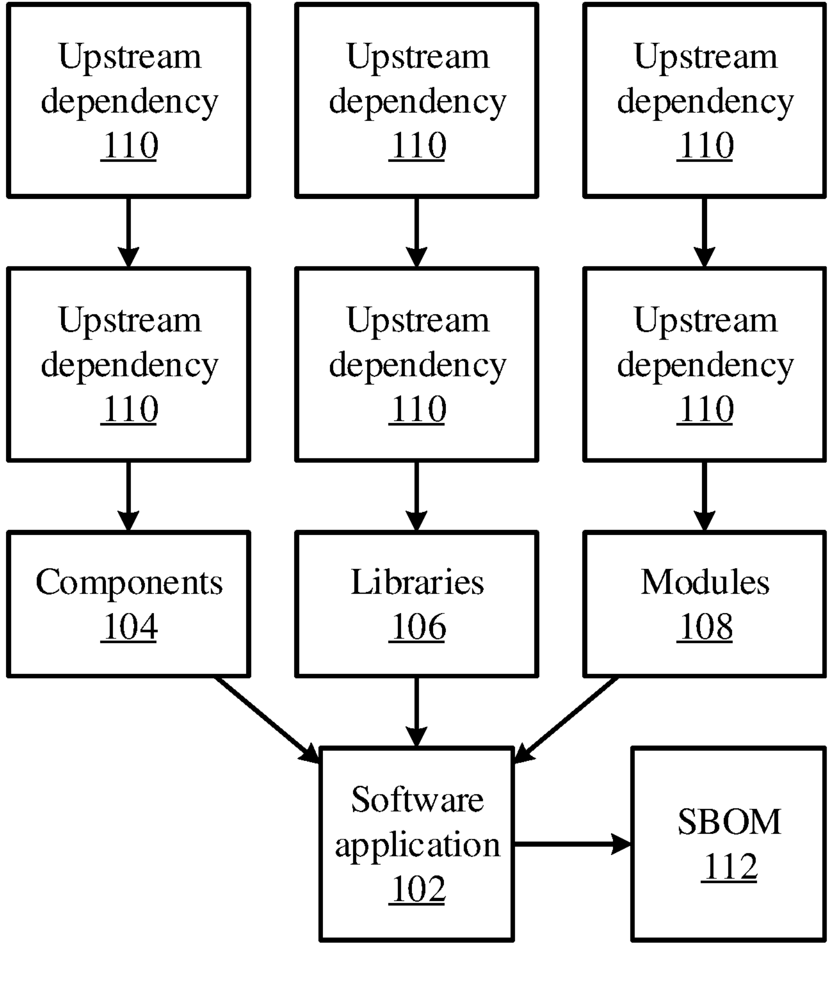
FIG. 1 is a block diagram illustrating a dependency tree for a software application that is represented by a software bill of materials (SBOM), in accordance with an embodiment of the present invention.

Referring now to FIG. 1, a diagram illustrates software dependencies in a software supply chain. A given software application 102 may be built using a variety of other software packages. For example, these software packages may include components 104, libraries 106, and modules 108. Each of these software packages may, in turn, have upstream dependencies 110 that they use. The upstream dependencies 110 may branch, with any given package depending from one or more upstream packages.

Each dependency may identify a particular software package as well as its version. Thus, a complete identification the dependencies of the software application 102 may include multiple different versions of a same package, and furthermore a given version of a given package may furthermore be used multiple times by multiple other packages.

The information regarding the dependencies of the software application 102 may be collected in an SBOM 112. There are a variety of tools that will generate an SBOM 112 for a given software application, but these tools may generate a high false-positive rate, for example due to their dependence on heuristic guesses and metadata. For example, some tools may extract dependencies from package managers, which may be manually specified by developers and which may fail to accurately identify all dependencies or may over-claim dependencies that remain unused through the software's lifecycle.

Some tools focus on the format of the SBOM 112, rather than its contents. These tools may evaluate the SBOM 112 according to industry-standard specification, and may judge the inclusion of identifiers, licenses, versioning information, and accurate documentation of component licenses. However, such evaluations do not extend to the accuracy and completeness of the content of the SBOM.

Manual verification of the SBOM 112 may be time-consuming and labor-intensive, particularly for large dependency networks, and may further lack consistency and reproducibility across different reviewers. Furthermore, manual verification still may not capture all of the dependencies for a software application 102, particularly in cases with deeply nested or transitive dependencies.

The SBOM 112 may therefore be automatically verified using an end-to-end approach that automatically evaluates the quality of realistic SBOMs that are provided by the developer of the software application 102. This automatic evaluation may be supplemented with in-depth case studies and root cause analysis for incomplete and inaccurate SBOMs. In some embodiments, JAVA® archive (JAR) binaries may be analyzed along with their corresponding SBOMs to identify inaccuracies and omissions. This binary-level program analysis provides more accurate results, particularly compared to tools that solely depend on metadata.

A JAVA® application may be packaged as a JAR file. The JAR file may include compiled JAVA® code and a MANIFEST.MF file, which has information describing the application. Many JAR files also include a pom.xml file, which may include additional information describing the application. The MANIFEST.MF and pom.xml files may be provided by the developer of the software application and may have incorrect or incomplete information. The compiled JAVA® code, however, is generated by a compiler and is treated herein as a source of ground truth information. This ground truth information may be extracted from the JAVA® files for validation.

Figure 2:
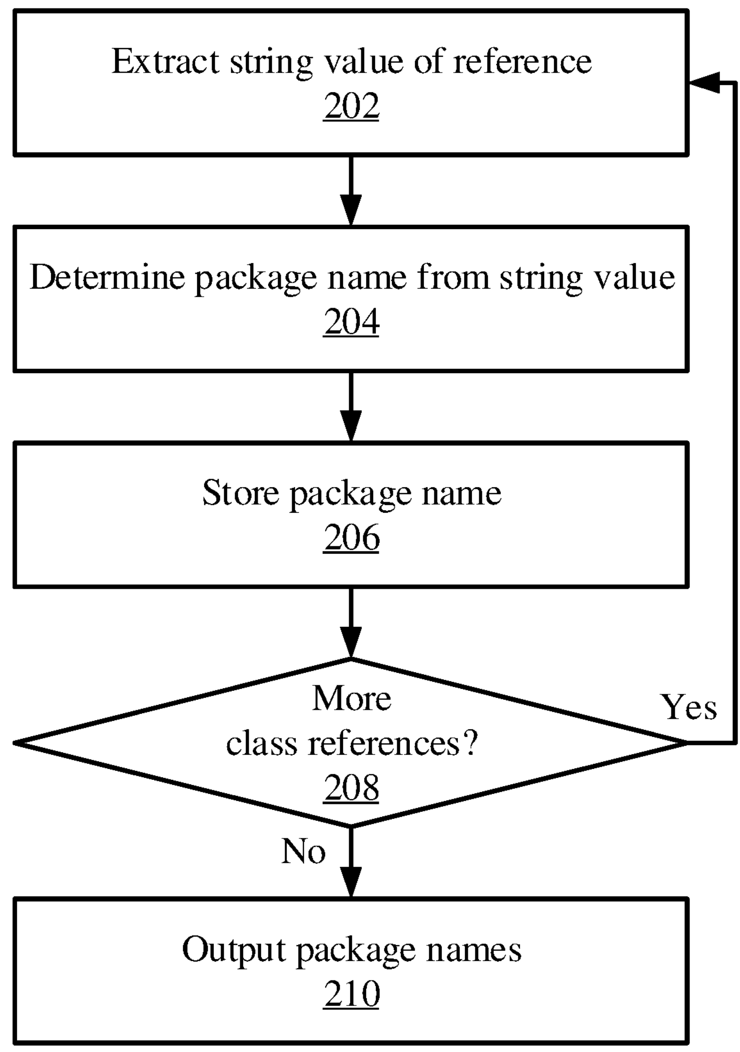
FIG. 2 is a block/flow diagram of a method of extracting package names from application code, in accordance with an embodiment of the present invention.

Referring now to FIG. 2, a method of identifying packages within a JAVA® class file is shown. Each JAVA® class file includes a constant pool, which has the fully qualified names of external classes that are referenced directly by the original JAVA® source file. A fully qualified name includes a package name and a class name, and may be expressed as a set of labels that are separated by periods. The package name may be extracted by stripping off the last label of a fully qualified name, as the last label generally identifies the class name. All of the externally referenced package names for a JAVA® may be collected in this manner.

Thus, block 202 searches for constants in the constant pool and identifies a class reference, extracting the string value of the reference. From the string value, block 204 then determines the package name by extracting all but the final label of the string value. Block 206 stores the package name and block 208 determines whether there are more class references to process. If so, the next string value is extracted in block 202. If not, processing ends and a list of the package names referenced in the JAVA® class file is output in block 210.

Figure 3:
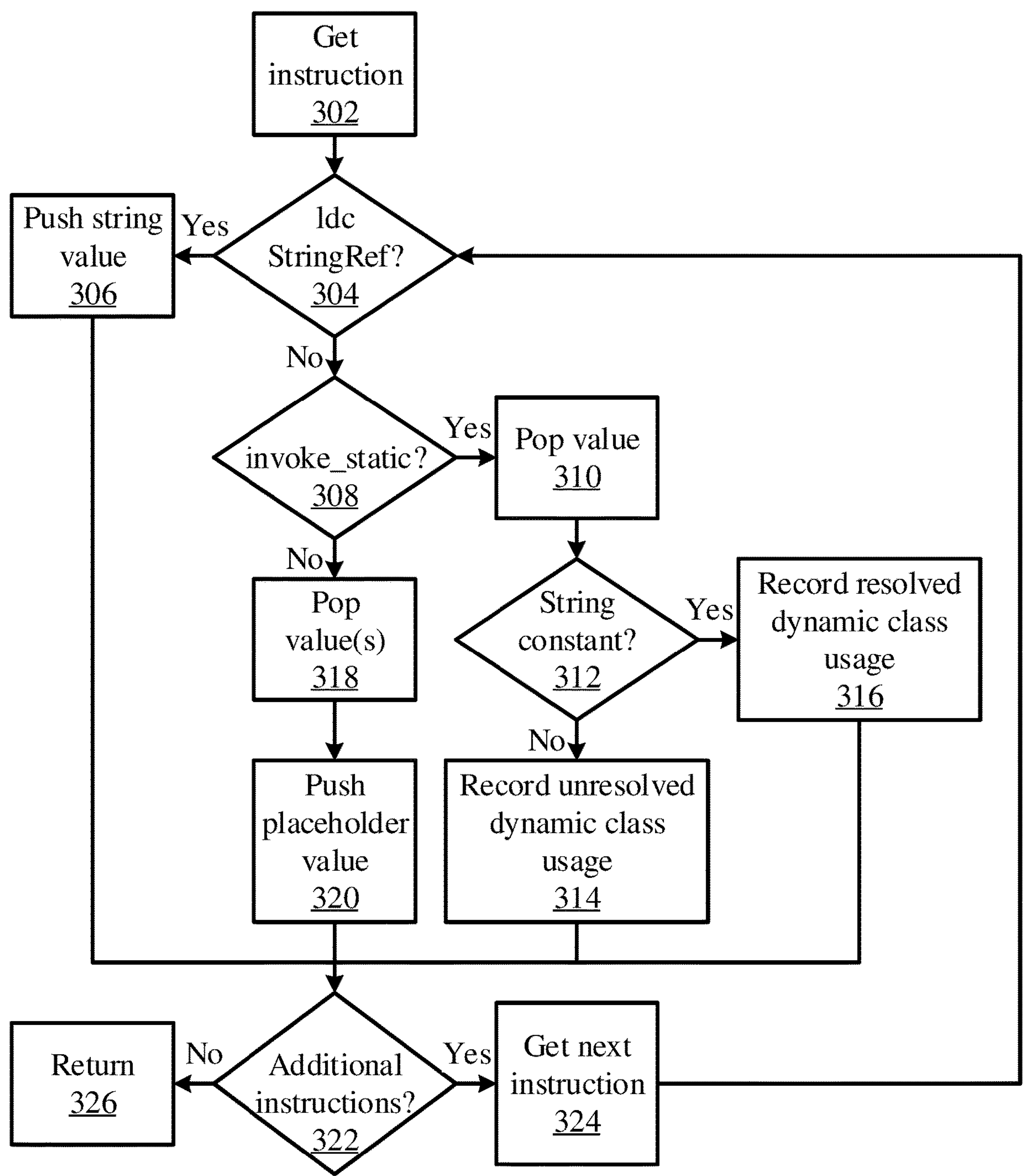
FIG. 3 is a block/flow diagram of a method of extracting package names from application accesses, in accordance with an embodiment of the present invention.

Referring now to FIG. 3, a method of extracting classes is shown based on access via a reflection application programming interface (API). The reflection API in JAVA® allows applications to access external classes at runtime, for example using strings to specify the class names. These classes may not appear in the constant pool as external class references. However, if the class name is a non-computed string constant, the value of the string constant will appear in the constant pool. Scanning the constant pool for string constants that have the format of a fully qualified class name can help, but may falsely identify strings as external references.

It is more accurate to use the reflection API to determine the inputs to the API. Thus, the class files within a JAR file are extracted. Each class file may be processed to perform a code walk on each code method. The reflection API may be initialized using the method java.lang.Class.forName( ) which takes a single argument of a String containing the name of a class. For example, if the API were called with, "Class<?> loggerClass=Class.forName("org.apache.log 4j.Logger");", then a class may be identified as "org.apache.log 4j.Logger".

The method java.lang.Class.forName( ) as well as other methods that can be used to initialize reflection, are considered targeted methods. For each class file, it can be determined whether it uses any of the targeted methods by scanning the constant pool for external methods that match a targeted method. If found, all of the class file's JAVA® bytecode may be scanned to find calls to the targeted method. The bytecode includes instructions corresponding to original source code. As the JAVA® virtual machine (JVM) is a stack-based system, scanning the bytecode to obtain the input to a targeted method involves maintaining a stack and performing an execution of the bytecode.

To avoid the complications of a full JVM implementation, the input value to a targeted method may be assumed to be pushed onto the JVM stack a few instructions before the call. Consideration may then be focused on the call to the targeted methods and the instructions that place the input value onto the stack. This may be either an 'ldc' or an 'ldc_w' instruction, which places a constant from the constant pool into the JVM stack. Any external accesses using the reflection API that do not use computed values will be discovered.

Thus, when a code walk is called on a code method, a first instruction is identified in block 302. Block 304 determines whether the instruction is an ldc StringRef. If so, block 306 pushes the string value from the constant pool onto the JVM stack—if the value is not a string, then an empty value may be pushed to the stack.

Otherwise, block 308 determines whether the instruction is an invoke static instruction of Class.forName( ), used to call targeted methods. If so, block 310 pops a value from the JVM stack. If block 312 finds the value to be a string constant, then block 316 stores a resolved dynamic class usage. Otherwise block 314 stores an unresolved dynamic class usage. If block 308 determines that the instruction is not an invoke static instruction, then block 318 pops one or more values from the JVM stack and block 320 pushed pushes a placeholder value, Because the code is not actually being executed, no real value is needed for the placeholder, so values other than the 'ldc' of a string constant are added, such as a 'None' value.

When the instruction has been processed, block 322 determines whether there are any additional instructions in the method. If so, block 324 gets the next instruction and processing returns to block 304. If not, block 326 ends processing. Any external accesses using the reflection API which do not use computed values will be included.

Figure 4:
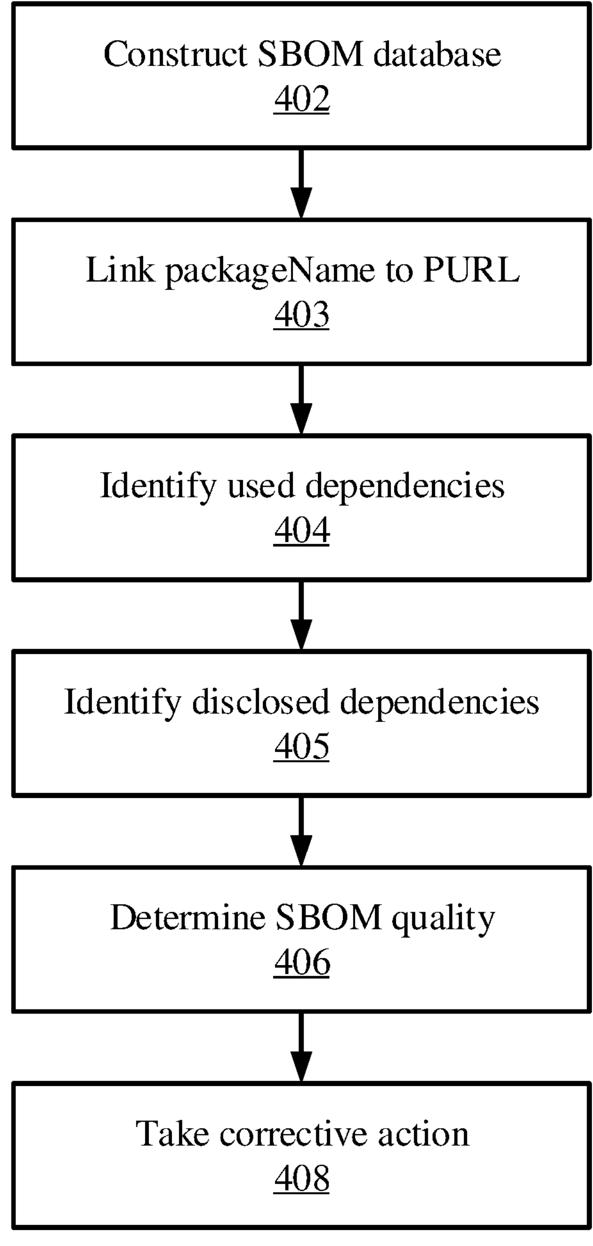
FIG. 4 is a block/flow diagram of a method of determining and evaluating an SBOM quality score, in accordance with an embodiment of the present invention.

Referring now to FIG. 4, a method for evaluating and correcting an SBOM is shown. Block 402 constructs an SBOM database from available sources. For example, a list of keywords may be used to identify SBOMs in a repository. Exemplary keywords may include Cyclonedx, spdx, sbom, cdx, and so on, and any of these keywords being associated with a .json or .xml extension may indicate that the file is an SBOM. The associated JAR files, which may be located in the same directory as an identified SBOM file, may be collected.

Block 403 extracts package names as described above. The SBOM lists dependencies and each may be a unique identifier called a package uniform resource locator (PURL). The PURL may include information relating to groupIP, artifactID, and package version. Only the package name can be extracted at the code level, which is not directly comparable to SBOM dependencies. Block 403 may therefore establish a mapping from packageName to PURL. For example, using the JAR artifacts collected in block 402, the package Name details may be extracted to create a correlation between packageName and PURL.

Block 404 identifies the dependencies that are used at the code level. The JAR packages can be used to obtain all active packageNames as described above. These packageNames may then be cross-referenced with the packageName-to-PURL correspondences to determine the dependencies that the program actually uses in a PURL representation.

Block 405 looks to the dependencies that are claimed by the developer of the software, for example in supplied SBOM files. Package names may be extracted and mapped to PURLs. The quality of the SBOM can then be assessed in block 406 by generating a quality score. Exemplary factors that may be considered in the quality score are inconsistency types, missing or inaccurate types, and the scopes of the dependencies. Recognizing missing or inaccurate dependencies can potentially lead to security risks, and further suggest varying levels of difficulty in implementing a fix. Furthermore, whether a dependency is required for compiling, runtime, testing, or some other purpose can influence the severity of a missing or inaccurate dependency. Each of these factors carriers its own severity weight, and these weights together influence the overall quality score. The severity weights can be tailored to the specific needs of an organization.

For example, the quality score may be evaluated as:

$$\text{score} = 10 \times (1 - \frac{\sum_{i=1}^{n} (w_1[i] + w_2[i] + w_3[i]) \times \text{counts } [i]}{(\max(w_1) + \max(w_2) + \max(w_3)) \times T}$$

where $w_1[i]$ is the level-1 weight for missing or inaccurate dependencies for the $i^{th}$ record, $w_2[i]$ is the level-2 weight for the type of missing or inaccurate dependencies for the $i^{th}$ record, $w_3[i]$ is the level-3 weight for the scope of dependencies for the $i^{th}$ record, counts[i] is the count for the specific combination of the three factors for the $i^{th}$ record, T is a predetermined total number of dependencies, and n is a number of records. Each record is a record of a dependency component in the SBOM that is found to be missing or inaccurate. The different level weights (e.g., $w_1$, $w_2$, and $w_3$) are determined for each respective record.

The formula integrates the weights from each type of consideration, the counts of each unique level combination, and a total number of dependencies. The score is normalized, using the maximum possible weight multiplied by the total dependencies, and reversed to ensure that higher scores signal higher SBOM quality. In this example the score is scaled to be between 1 and 10, but it should be understood that any appropriate scaling may be used instead.

Organizations can tailor the weights based on their specific requirements. For example, resource-constrained entities may prioritize weights toward inaccurate dependencies to minimize false alerts. Security-centric organizations may assign greater weights to missing dependencies to ensure that no vulnerabilities are overlooked.

Once a score has been determined, block 408 performs a responsive action. Depending on where the software package is used, the responsive action may be tailored to correct th reflect the particular needs of the application. In some cases, a vendor may be informed of deficiencies in the SBOM. In other cases, the SBOM may be automatically augmented to correct inaccuracies and/or supplement omissions. For example, the SBOM may be automatically edited to add information relating to dependencies that were detected as being used by the program code, but that were omitted by the SBOM. In a further example, the corrective action 408 may disable an installed software package associated with the SBOM. This action may be appropriate in a highly trusted system where an inaccurate or incomplete SBOM may obscure a security vulnerability. In such a situation, the software package may be prevented from executing until an SBOM can be provided that has a quality score above an associated threshold.

Figure 5:
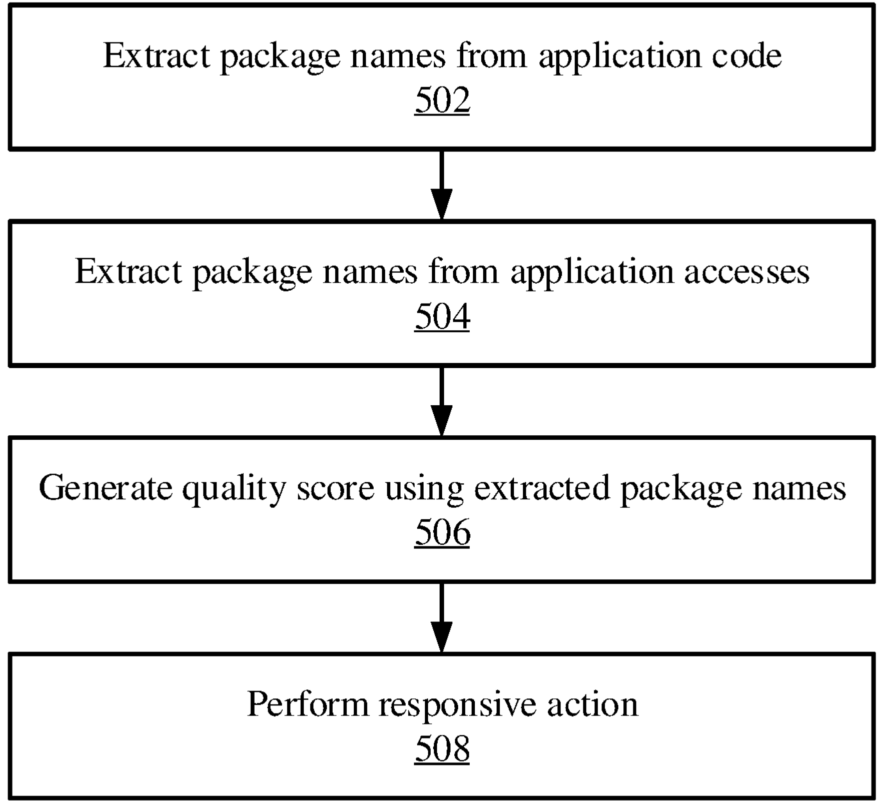
FIG. 5 is a block/flow diagram of a method of assessing and responding to an SBOM for an application, in accordance with an embodiment of the present invention.

Referring now to FIG. 5, a method of identifying dependencies of a package to verify an SBOM is shown. Block 502 extracts package names from application code, for example as described above in reference to FIG. 2. Block 504 extracts package names from application accesses, for example as described above in reference to FIG. 3. Block 506 generates a quality score for an SBOM associated with the application using the extracted package names, for example as described above in reference to FIG. 4. Block 508 then performs a responsive action based on the quality score.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
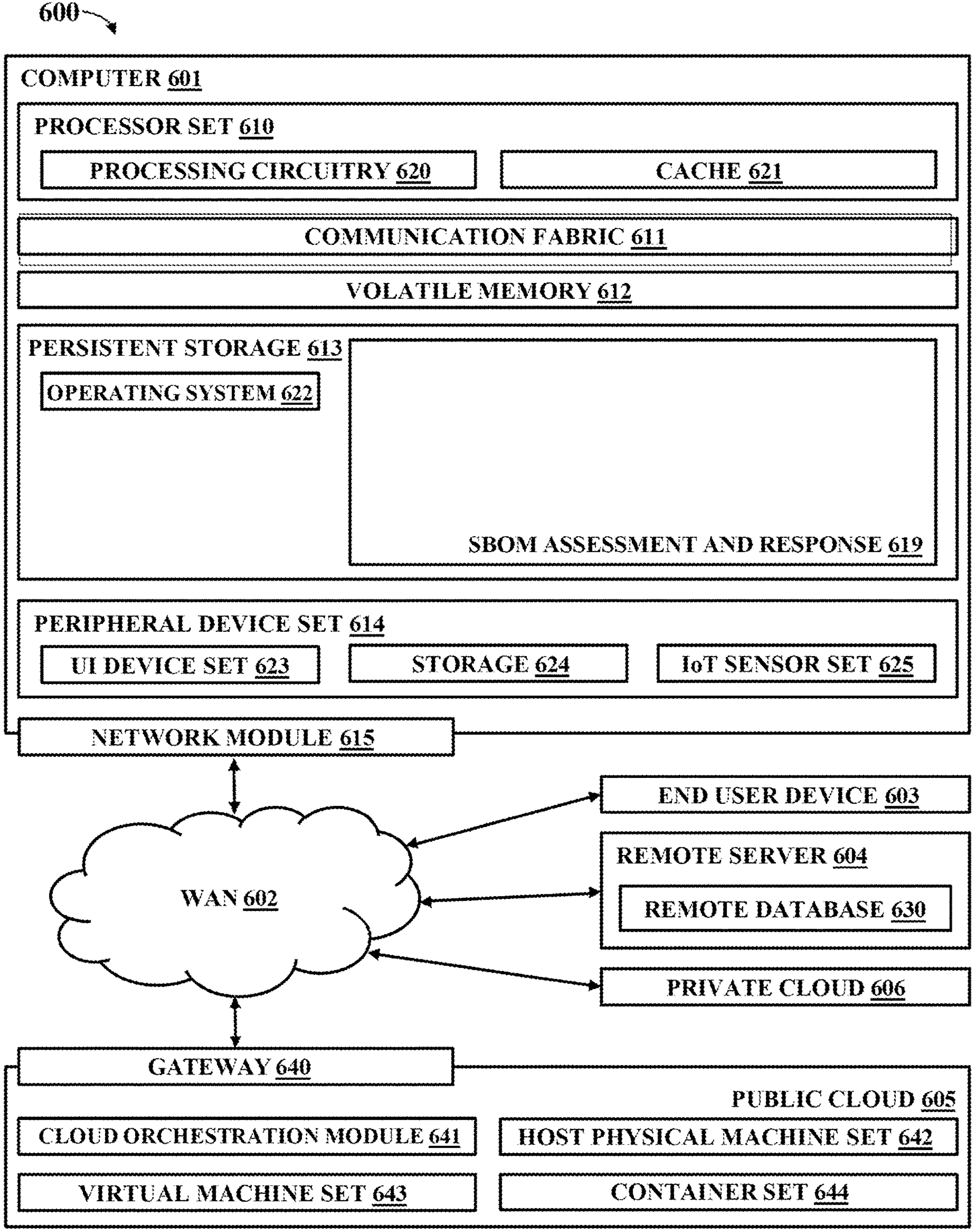
FIG. 6 is a block diagram of an exemplary computing system that can assess and respond to an SBOM for an application, in accordance with an embodiment of the present invention.

Referring now to FIG. 6, a block diagram of a computing environment is shown. Computing environment 600 contains an example of an environment for the execution of at least some of the computer code involved in performing the inventive methods, such as SBOM assessment and response 619. In addition to block 619, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 619, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible.

Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 619 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 619 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices.

Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602. Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Having described preferred embodiments of accessing JAVA® SBOM accuracy and completeness (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for assessing a software bill of materials (SBOM), the computer-implemented method comprising:

extracting package names from code of an application to identify first dependencies of a plurality of dependencies of the application;

extracting package names from accesses by the application to identify second dependencies of the plurality of dependencies of of the application;

generating a quality score for the SBOM of the application based on a comparison of contents of the SBOM to the first dependencies and the second dependencies, with each dependency of the first dependencies and the second dependencies being weighted according to a combination of a weight for missing dependencies or inaccurate dependencies, a weight of a type of the missing dependencies or the inaccurate dependencies, and a weight for a scope of dependencies; and performing an action responsive to the quality score, wherein the performing of the action includes disabling execution of the application responsive to the quality score that is below a predetermined threshold.

2. The computer-implemented method of claim 1, wherein the extracting of the package names from the code includes determining package names from a string value of a class reference.

3. The computer-implemented method of claim 2, wherein the class reference is identified in a constant pool.

4. The computer-implemented method of claim 2, wherein the determining of the package names includes extracting all but a final label of the string value.

5. The computer-implemented method of claim 1, wherein the extracting of the package names from the accesses includes performing a code walk on a code method of a class file.

6. The computer-implemented method of claim 5, wherein the code walk includes identifying calls to methods from a list of targeted methods that accept a class as input.

7. The computer-implemented method of claim 5, wherein the class file is extracted from a JAVA® archive file.

8. The computer-implemented method of claim 1 wherein the generating of the quality score includes dividing combined weight scores by a maximum weight score across a number of dependencies of the plurality of dependencies.

9. A computer program product for assessing a software bill of materials (SBOM), the computer program product comprising a computer readable storage medium having program instructions embodied therewith, the program instructions being executable by a hardware processor to cause the hardware processor to:

extract package names from code of an application to identify first dependencies of a plurality of dependencies of the application;

extract package names from accesses by the application to identify second dependencies of the plurality of dependencies of the application;

generate a quality score for the SBOM of the application based on a comparison of contents of the SBOM to the first dependencies and the second dependencies, with each dependency of the first dependencies and the second dependencies being weighted according to a combination of a weight for missing dependencies or inaccurate dependencies, a weight of a type of the missing dependencies or the inaccurate dependencies, and a weight for a scope of dependencies; and perform an action responsive to the quality score, wherein the performance of the action includes disabling execution of the application responsive to the quality score that is below a predetermined threshold.

10. A system for assessing a software bill of materials (SBOM), the system comprising:

a hardware processor; and a memory that stores a computer program which, when executed by the hardware processor, causes the hardware processor to:

extract package names from code of an application to identify first dependencies of a plurality of dependencies of the application;

extract package names from accesses by the application to identify second dependencies of the plurality of dependencies of the application;

generate a quality score for the SBOM of the application based on a comparison of contents of the SBOM to the first dependencies and the second dependencies, with each dependency of the first dependencies and the second dependencies being weighted according to a combination of a weight for missing dependencies or inaccurate dependencies, a weight of a type of the missing dependencies or the inaccurate dependencies, and a weight for a scope of dependencies; and perform an action responsive to the quality score, wherein the performance of the action includes disabling execution of the application responsive to the quality score that is below a predetermined threshold.

11. The system of claim 10, wherein the computer program further causes the hardware processor to determine the package names from a string value of a class reference.

12. The system of claim 11, wherein the class reference is identified in a constant pool.

13. The system of claim 11, wherein the computer program further causes the hardware processor to extract all but a final label of the string value.

14. The system of claim 10, wherein the computer program further causes the hardware processor to perform a code walk on a code method of a class file.

15. The system of claim 14, wherein the code walk includes identification of calls to methods from a list of targeted methods that accept a class as input.

16. The system of claim 14, wherein the class file is extracted from a JAVA® archive file.

17. The system of claim 10, wherein the computer program further causes the hardware processor to device combined weight scores by a maximum weight score across a number of dependencies of the plurality of dependencies.

* * * * *